Figure 1:
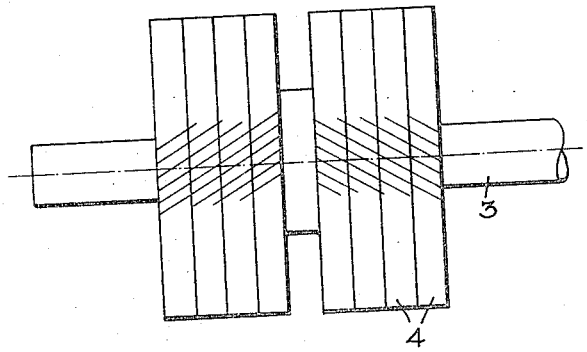

K. ALQUIST.
ELASTIC HELICAL GEARING.
APPLICATION FILED MAY 3, 1915.

1,165,828.

Patented Dec. 28, 1915.

Inventor:
Karl Alquist,
by: [signature]
His Attorney.

UNITED STATES PATENT OFFICE.

KARL ALQUIST, OF SCHENECTADY, NEW YORK.

ELASTIC HELICAL GEARING.

1,165,828.

Specification of Letters Patent. Patented Dec. 28, 1915.

Original application filed January 17, 1914, Serial No. 812,812. Divided and this application filed May 3, 1915. Serial No. 25,513.

*To all whom it may concern:*

Be it known that I, KARL ALQUIST, a subject of the King of Sweden, residing at Schenectady, county of Schenectady, State of New York, have invented certain new and useful Improvements in Elastic Helical Gearing, of which the following is a specification.

The present application is a division of my application Serial No. 812,812, filed January 17, 1914.

My invention relates particularly to elastic helical spur gearing of the type which comprises a plurality of elastic or flexible plates or laminations rigidly mounted on a shaft or support, there being a small clearance space between each two plates near the periphery. The face of the gear is provided with helically cut teeth which are free to yield laterally by a slight amount under the pressure of the teeth of the coöperating gear. This yielding of the gear teeth is due to the fact that the metal plates are elastic and also to the fact that each plate at its periphery is separated from the other by a small space.

I have found that when a gear is built up from a pack of comparatively thin laminations, the individual laminated teeth run in certain respects under conditions approximately those of ordinary straight teeth and under similar disadvantages, although the teeth are cut helically across the pack of laminations. The essential characteristic of the helical type, the load concentration on the pitch line, is practically missing, and the work is distributed over the whole tooth surface in a similar way as in the case of a straight gearing.

I have found by experiments that in order to obtain the special advantages of the helical type of gearing with the multiple disk construction, while retaining the advantage of flexibility or elasticity and avoiding certain difficulties present in connection with the running of this type of gearing, it is important that the teeth of each disk should have a certain axial width depending on the pitch and the angle of the teeth with the axis. This width is determined by what may be called the principle of continuous pitch line; i. e., each disk should have such a width that the projection on a plane at right angles to the axis of the gear of all the pitch lines on the teeth of the disk will form a complete circle. In helical gearing, though the contact between the teeth is a line contact, this line is, as is well understood, with regard to practical value for carrying load, so short as to form only a point contact (being the intersection of the line of contact and the pitch line) because the tooth surface outside the pitch line is subject to rapid wear, due to the sliding action of the teeth, and the driving pressure is concentrated on a point moving along the pitch line as the gears revolve. There is evidently one such pressure point for each tooth crossing the driving line. This pressure point may also be defined as the intersection between the driving line and the pitch line.

The principle of the invention may also be stated in another form by saying that each individual disk should carry the load at any time only on one (theoretical) pressure point, being a point common to the driving line and the pitch line, or that, in other words, the number of pitch line pressure points in a gear built up according to this invention is equal to the number of disks. The required axial width, as described above, will be given by the equation $$b = p/\tan. a$$

where $b$ = axial width of a disk and $p$ = circumferential pitch $a$ = angle of teeth with axis.

In practice it is advisable to add approximately 10% to the theoretical width given for reasons of strength of the teeth against bending, so that the full load may never be carried just at the end of a tooth where it is weakest. This will, of course, add to the length of the gear, but on account of the relative increase in strength of the teeth thus obtained a smaller pitch may be used which more than makes up for the additional length by increasing the wearing surface, as now there will be more teeth crossing the driving line per unit length. The combination described gives about the maximum power transmission obtainable for a certain size of gear.

It will be understood that, if the width of the disk is increased substantially beyond the dimensions given, the load for a given disk will be carried alternately on one and two pressure points thus giving unequal surface load. If the width were increased so that two points were theoretically always carrying the load; i. e., if the width were doubled, this would, at first sight, seem to be an acceptable condition, but apart from other disadvantages it will be found that as a rule only one point carries the load of the disk, due to the deflection, and a larger pitch would have to be chosen for reasons of strength, involving loss in wearing surface, and in general practice such a gear will be considerably inferior to the one pressure point type described, though it may be used for reasons of economy in special cases where large disks are necessary.

Figure 2:
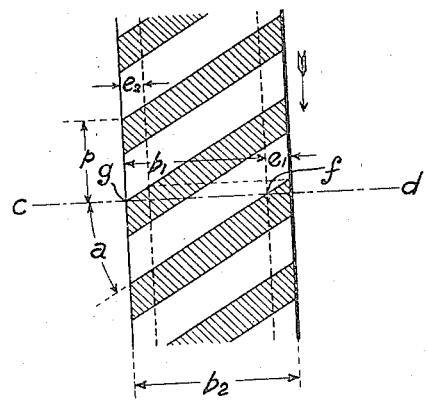

I have in the attached drawing shown diagrammatic views of a gear made according to this invention. Figure 1 shows a plan of a gear built up from a number of disks (the clearance between the rims not being shown), and Fig. 2 gives a developed plan of a portion of the rim of one disk on a larger scale, the teeth being shown in section on the pitch line, and illustrates the equation already given for the width.

Referring to Fig. 1, 3 indicates a shaft carrying a helical gear wheel formed of the plates or laminations 4. In Fig. 2 the theoretical width is represented by $b_1$; additional width is $e_1$. The spaces defined by $e_1$ and $e_2$ will carry the load at the same time. The practical width is thus $b_1 + e_1 = b_2$. The line $c-d$ represents the driving line and $p$ and $a$ are respectively circumferential pitch and helical angle of the teeth. A pressure point, as previously described, is the intersection between the line $c-d$ and a pitch line, and it will be understood from the figures that when the disks revolve (the driving line being stationary), such a pressure point will move along a pitch line as this line is crossing the line $c-d$, and each disk will only have one pressure point on the main or middle portion of its face or width for transmitting the load at any time, but will have two pressure points (on parts $e_1$ and $e_2$) while the load is shifted from one tooth to the next. Fig. 2 shows the teeth in such a position with reference to the driving line that the two pressure point period is just commencing, one pressure point being at $f$ and the other about to start at $g$, the teeth moving in the direction indicated by the arrow.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A gear comprising a plurality of laterally flexible helical toothed members arranged side by side so as to be capable of lateral deflection, the axial width of the teeth of each member being substantially such as to give continuously a single pitch line contact.

2. A helical gear comprising a plurality of elastic plates clamped together at their central portions and free to yield laterally under tooth pressure, the teeth of each plate having an axial width substantially equal to the circumferential pitch of the teeth divided by the tangent of the angle which the teeth make with the axis of the gear.

3. A helical gear comprising a plurality of elastic plates clamped together at their central portions and free to yield laterally under tooth pressure, the axial width of each plate being such that the teeth cut thereon will have a width slightly greater than the circumferential pitch of the teeth divided by the tangent of the angle which the teeth make with the axis of the gear.

4. A helical gear comprising a plurality of elastic disks firmly clamped together at their central portions and slightly spaced apart at their peripheries so as to be capable of slight axial yielding, the axial width of the teeth bearing such relation to the circumferential pitch and the angle which the teeth make with the axis of the gear that the number of pitch line pressure points will be equal to the number of disks the greatest part of the time.

In witness whereof, I have hereunto set my hand.

KARL ALQUIST.

Copies of this patent may be obtained for five cents each, by addressing the "Commissioner of Patents, Washington, D. C."